United States Patent
Powell

(10) Patent No.: US 11,926,786 B2
(45) Date of Patent: Mar. 12, 2024

(54) OXIDIZED POLYETHYLENE RHEOLOGICAL ADDITIVES FOR OIL-BASED DRILLING FLUIDS

(71) Applicants: Thomas W Powell, Amargosa Valley, NV (US); RHEOMINERALS LLC, Reno, NV (US)

(72) Inventor: Thomas W Powell, Amargosa Valley, NV (US)

(73) Assignee: RheoMinerals LLC, Reno, NV (US)

( * ) Notice: Subject to any disclaimer, the term of this patent is extended or adjusted under 35 U.S.C. 154(b) by 0 days.

(21) Appl. No.: 17/792,141

(22) PCT Filed: Jan. 13, 2021

(86) PCT No.: PCT/US2021/013235
§ 371 (c)(1),
(2) Date: Jul. 11, 2022

(87) PCT Pub. No.: WO2021/146282
PCT Pub. Date: Jul. 22, 2021

(65) Prior Publication Data
US 2023/0061326 A1    Mar. 2, 2023

Related U.S. Application Data

(60) Provisional application No. 62/961,053, filed on Jan. 14, 2020.

(51) Int. Cl.
*C09K 8/34* (2006.01)

(52) U.S. Cl.
CPC ..................... *C09K 8/34* (2013.01)

(58) Field of Classification Search
None
See application file for complete search history.

(56) References Cited

U.S. PATENT DOCUMENTS

| | | | | |
|---|---|---|---|---|
| 4,489,180 | A * | 12/1984 | Lundberg | C09K 8/588 525/203 |
| 7,151,077 | B2 * | 12/2006 | Prud'homme | C09K 8/70 507/224 |
| 2008/0064614 | A1 * | 3/2008 | Ahrenst | C09K 8/68 507/221 |
| 2008/0217012 | A1 * | 9/2008 | Delorey | C09K 8/703 166/244.1 |
| 2010/0071893 | A1 * | 3/2010 | Caritey | C09K 8/58 523/130 |
| 2011/0232907 | A1 * | 9/2011 | Bryant | E21B 43/267 166/300 |
| 2018/0155597 | A1 * | 6/2018 | Burns | C09K 8/03 |
| 2018/0244975 | A1 * | 8/2018 | Khramov | E21B 21/062 |
| 2018/0298274 | A1 * | 10/2018 | Zhao | C09K 8/92 |

* cited by examiner

Primary Examiner — John J Figueroa
(74) Attorney, Agent, or Firm — Jay R Akhave; Patent Science LLC

(57) ABSTRACT

The invention describes the use of both low-density oxidized polyethylene wax (LDoxPE) and high-density oxidized polyethylene wax (HDoxPE) as rheological additives in oil-based drilling fluids (OBF). This includes both 100% oil and invert emulsion drilling fluids in which the continuous phase is diesel oil, mineral oil, synthetic esters, synthetic olefins, or other organic fluid.

3 Claims, No Drawings

OXIDIZED POLYETHYLENE RHEOLOGICAL ADDITIVES FOR OIL-BASED DRILLING FLUIDS

CROSS REFERENCE TO RELATED APPLICATIONS

This application claims the benefit of U.S. Provisional Patent Application No. 62/961,053 filed Jan. 14, 2020.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of this material in this patent document may be the subject of copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

Technical Field

This invention relates to the formulation of various physical forms of oxidized polyethylene and oxidized polyethylene derivatives and their use as a rheological additive in invert drilling fluids.

Background Discussion

Polyethylene plastics (PE) are divided into high density polyethylene (HDPE) and low density polyethylene (LDPE). LDPE has a more branched molecular structure and is less crystalline than HDPE. LDPE melts at a lower temperature and is softer than HDPE. Conversely, HDPE molecules are more linear. The HDPE molecules can more closely pack resulting in HDPE being harder and melting at higher temperature compared to LDPE. The HDPE has a more crystalline nature than LDoxPE.

Both HDPE and LDPE may be oxidized to form oxPE. The oxidation of the PE introduces carboxylic acid sites on the PE molecule. The degree of oxidation of the PE is expressed in terms of acid number. Acid number is defined as, "mg KOH required to neutralize the acidity in 1 gram of oxPE." In industrial applications this acidity can be neutralized with KOH, NaOH, or amines in order to help emulsify the oxPE in water. These oxPE emulsions have many commercial applications in adhesives, coatings, inks, and wax finishes. The carboxylic functionality imparts pigment wetting and surface adhesion properties to the oxPE.

Attempts have been made to introduce cryogenically ground LDoxPE as rheological additives for coatings, but cryogenic grinding is expensive and the ground LDoxPE still does not completely dissolve at the temperatures generated during coating manufacturing. Particles of undispersed LDoxPE are unacceptable in a coating as the LDoxPE particles negatively influence gloss. Drilling fluids can more tolerate coarse particles.

For many years LDoxPE solvent dispersions (typically xylene or mineral oil based) have been used as rheological additives in the coatings industry. Elementis Specialties markets these dispersions under the MPA trademark.

The MPA type LDoxPE dispersions are added to the pigment grind during the coating production process wherein temperatures can reach 125 F. The high shear dispersion and elevated temperature in the pigment grind ensure complete incorporation of the LDoxPE dispersion. Once fully incorporated into the coating the LDoxPE forms a loose network of LDoxPE molecules that imparts very low shear rate viscosity to the coating while not appreciably increasing high shear viscosity, control of which is critical for optimum coating application properties whether by brushing, rolling, or spraying. Elementis has developed various grades of the MPA product including a more efficient grade (MPA 1075X) and a more pourable grade (MPA 2000X). All these grades share the common characteristics of relatively low percentage (approximately 25%) active LDoxPE dispersed in flammable solvents. These products require packaging in steel drums for shipment. LDoxPE dispersions in volatile solvents cannot be used in oil-based drilling fluids. Dispersions can be produced by dissolving the LDoxPE in drilling fluid base oils such as diesel or mineral oil, with mineral oil being preferred due to lower flammability and toxicity, One preferred embodiment of this invention is a pourable dispersion of HDoxPE powder in a very low aromatic mineral oil. The HDoxPE is suspended by the addition of a lesser amount of LDoxPE copolymer, which forms a paste dispersion at relatively low processing temperatures. This combination offers package stability, product pourability, lower flammability, lower toxicity, initial ambient temperature rheological activity, and high downhole temperature rheological activity.

BRIEF SUMMARY OF THE INVENTION

The invention describes the use of both low-density oxidized polyethylene wax (LDoxPE) and high-density oxidized polyethylene wax (HDoxPE) as rheological additives in oil-based drilling fluids (OBF). This includes both 100% oil and invert emulsion drilling fluids in which the continuous phase is diesel oil, mineral oil, synthetic esters, synthetic olefins, or other organic fluid.

Polyethylene may be copolymerized with other monomers to alter specific properties of the resulting copolymer. For instance, polyethylene may be copolymerized with vinyl acetate (such as A-C 645P—Honeywell) and, when oxidized, yielding LDoxEVA, or polyethylene may be copolymerized with acrylic acid (such as A-C 5120—Honeywell) and, when oxidized, yielding LDoxEA. Use of such oxidized copolymers should be considered within the scope of the invention.

The invention demonstrates various means of practically introducing both LDoxPE and HDoxPE into an oil-based fluid (OBF) whereupon the oxidized polyethylene wax (oxPE) is heat activated during downhole circulation and develops a shear thinning rheology in the OBF. Such a rheological profile improves suspension of weighting agents (typically barite) and drill cuttings while improving the pumpability of the OBF and increasing the rate of penetration (ROP) of the drill bit.

Testing indicates that oxPE density and acid number are major factors in the efficacy of a given grade of oxPE as a rheological additive for invert drilling fluids. As a general rule, LDoxPE and LDoxPE copolymers develop low shear rheology at lower downhole temperatures than HDoxPE, but that rheology dissipates as downhole temperature increase. Conversely, HDoxPE require somewhat higher downhole temperatures to fully develop beneficial rheology, but that rheology does not dissipate until high downhole temperatures are encountered. LDoxPE and LDoxPE copolymers can be relatively easily processed into solvent borne paste dispersions while HDoxPE powders do not easily soften to form paste dispersions. Higher acid number oxPE tend to emulsify in water more easily.

Perhaps the most outstanding benefit of the invention is the thermal stability imparted to the OBF. Organoclays are typically used to control the rheology of OBF. Bentonite based organoclays exhibit decreasing rheological performance as downhole temperatures rise above 250 F. Hectorite based organoclays show similar decreases in rheological performance at 300 F to 350 F. The HDoxPE based invention heat activates at 200 F-250 F and, once activated, maintains rheological performance as downhole temperatures increase up to 350 F, or higher. The use of a combination of organoclay and oxPE for rheological control results in a drilling fluid with more stable rheology as a function of temperature and, at a given temperature, a flatter rheological profile with higher low shear rate viscosities and lower high shear rate viscosities. An invert drilling fluid containing a combination of organoclay and HDoxPE exhibits a combination of low temperature rheological development from the organoclay and excellent rheology at high temperatures provided by the HDoxPE. Combining organoclay with HDoxPE also improves the grinding properties of the HDoxPE during manufacture.

DETAILED DESCRIPTION OF THE INVENTION

OxPE, both LDoxPE and HDoxPE, when introduced into an oil-based drilling fluid via the herein described methods, will activate at commonly encountered downhole temperatures as low as 200 F. The oxPE will impart beneficial shear thinning rheology to the OBF and suspend weighting materials and drill cuttings with little increase in the apparent viscosity of the OBF. High apparent viscosity negatively impacts pumpability of the fluid and decreases the rate of penetration of the drill bit. The HDoxPE based embodiment of the invention imparts a beneficial rheological profile to the OBM which persists at downhole temperatures as high as 350 F making the invention a viable candidate for use in high pressure, high temperature (HPHT) oil-based fluids.

The oxPE may be introduced into the OBF via any of the following routes:
An oxPE dispersion in a suitable base oil
An oxPE fine powder
An aqueous emulsion of oxPE
A blend of ground organoclay and ground oxPE
A composite of oxPE deposited uniformly upon an organoclay, or other carrier, either from an aqueous emulsion, or solvent dispersion.

Two preferred embodiments of the invention are the aforementioned HDoxPE dispersion and a finely ground mixture of HDoxPE (such as OPI 1316) and fast yielding bentonite organoclay (such as RheoMinerals B92). The HDoxPE is easier to mechanically grind than LDoxPE due to the higher crystallinity of the HDoxPE. The blend of organoclay and HDoxPE mechanically grinds more easily than HDoxPE alone as the organoclay acts as a detackifying agent during the grinding process.

This same approach may be used with a hectorite based organoclay/HDoxPE mixture. The hectorite organoclay (such as Elementis Specialties' BENTONE 38) does not yield as quickly as a bentonite based organoclay, but the hectorite organoclay rheology degrades at a slower rate as a function of temperature compared to bentonite organoclay.

Yet another class of organoclays based upon the hormite clays, sepiolite and attapulgite, can also be used in combination with the HDoxPE. These hormite based organoclays (such as Elementis Specialties' BENTONE 990 and RheoMinerals' RM99 Plus) do not yield quickly under low temperature and low shear dispersion conditions and are strictly low shear rheology modifiers. These hormite organoclays do have excellent thermal stability so combinations of hormite organoclay/HDoxPE are excellent low shear rheology modifiers for HPHT oil-based drilling applications. Such low shear rheology modifiers are extremely important in deviated (horizontal) drilling in order to prevent barite sag (settling).

oxPE may also be introduced into the OBF in powder form. Mechanically grinding oxPE is difficult. HDoxPE is more crystalline and grinds more easily than LDoxPE. HDoxPE is still quite difficult to grind as it softens at elevated temperatures and the HDoxPE particles tend to deform rather than break apart during grinding. Cryogenic grinding of the HDoxPE is practical, but expensive. When added to the OBF as a powder, the oxPE will begin to activate at downhole temperatures as low as 200 F. Cryogenic grinding can be simulated in the lab by placing the HDoxPE in a freezer, then grinding the "frozen" oxPE in a lab hammer mill. The ground oxPE is then sieved to collect the fines and the overs are refrozen, reground, and re-sieved. The yield from this process is very low due to the previously outlined difficulties in grinding HDoxPE. OBM can tolerate relatively coarse particles, so a relatively coarse (60 mesh topsize) powder may mitigate grinding cost.

oxPE is emulsifiable in water if the oxPE has sufficient acid number. oxPE with low acid numbers around 15 are only marginally emulsifiable (such as A-C 629 LDoxPE—Honeywell and OPI 1316 HDoxPE). oxPE with higher acid number around 40 (such as A-C 395A HDoxPE—Honeywell) are relatively easily emulsified by the neutralization of the oxPE acidity with KOH, NaOH, or amines.

Optionally, dependent upon the emulsion stability of the oxPE, a surfactant may be used to help stabilize the emulsion. Invert emulsion OBF typically contain 10-40% water by volume. Emulsifiers are used to stabilize invert OBF. Such emulsifiers can also be used to stabilize an HDoxPE in water emulsion. In this manner a non-flammable emulsion of HDoxPE in water may be produced for direct addition to an invert OBF. The water, emulsifier (if used), and HDoxPE all serve useful purposes in the OBF. The oxPE from the emulsion will remain in the oil phase of the OBF as a rheological modifier, the water becomes part of the dispersed phase of the invert OBF, and if emulsifier is used, it will help stabilize the invert OBF.

An emulsion of oxPE can also be used to deposit the oxPE uniformly over the surface of a carrier, such as an organoclay. For example, the previously mentioned A-C 395 emulsion can be produced using a quaternary ammonium compound (such as VARIQUAT 343 E82) as an emulsifier. The oxPE is charged to a heated kettle at 210 F and the acidity is neutralized with hot 50% NaOH solution. Molten (180 F) VARIQUAT 343 E82 is then added to the kettle in sufficient quantity to render the subsequently added bentonite carrier organophilic. Once the bentonite is charged to the kettle, the quaternary ammomium compound cation exchanges onto the clay surface and the oxPE emulsion particles are deposited uniformly over the newly formed organoclay. The wet organoclay/oxPE mixture is then extruded for further homogenization. The mixture is then dried to <4% free moisture and fine grinding is easily accomplished.

The oxPE can be dissolved in a suitable solvent (such as xylene) and then used to uniformly coat organoclay, or other carrier, with the oxPE by simply mixing the organoclay into the oxPE/solvent dispersion, or spraying the oxPE/solvent dispersion onto the organoclay. The organoclay/oxPE composite is then dried and ground. This is a more complicated and expensive method of introducing the oxPE into an OBF.

At elevated temperature, the oxPE can be dispersed into a suitable base oil for OBF (such as diesel, mineral oil, synthetic ester, or synthetic olefin) and marketed as a 25% active paste analogous to the MPA type products for coatings. The use of relatively low flammability, low toxicity mineral oil reduces the safety issues related to the shipment of relatively low activity hazardous pastes in steel drums. For the drilling industry, a pourable paste offers ease of handling on the rig, or at the "mud plant". An analogous method for the preparation of a pourable paste for coatings applications is covered in US Patent US20040147662A1 and utilizes the LDoxEVA (A-C 645P—Honeywell).

As previously described, HDoxPE powder can be dispersed into a suitable base oil for OBF. When based upon a low flammability, low toxicity mineral oil (such as NEOFLO 4633) and marketed as a 30% active paste this embodiment offers versatility and convenience for mud engineers. An analogous method for the preparation of a pourable paste for coatings applications is covered in US Patent US20040147662A1 and utilizes the LDoxEVA (A-C 645P—Honeywell).

Several embodiments of the invention are shown in the following examples. Below are provided embodiment of the invention in Example from 1 through 6.

Each example details the preparation of the special additive form of oxidized polyethylene, incorporation of the additive into the OBF, testing of the compounded OBF, measuring OBF performance, evaluating comparative performance along with performance data of standard industry additives.

Also shown below in each of the tables provided in the Examples is the compounding method and recipe used to make the OBF in each case. This typically follows the performance data in each case.

EXAMPLE #1

Preparation of Powder Rheological Additive

A uniform blend of 75%/25% on a dry basis RheoMinerals B92 organoclay pellets and OPI 1316 (high density oxidized polyethylene) granules was ground in a Lab IKA Hammer Mill. The ground mixture was screened through a 60mesh screen in order to remove any large agglomerates. Care was taken when handling the ground organoclay/HDoxPE mixture to ensure that sieving did not segregate any HDoxPE particles from the finer organoclay fraction.

Preparation of OBF

Two invert OBFs (one in diesel and the other in mineral oil) were made using the EXAMPLE #1 additive in the following recipe templates.

In Diesel Based OBF

A 12 pounds per gallon (ppg), 80:20 oil to water ratio (OWR) invert diesel drilling fluid.

To 194 g. Red Diesel add emulsifiers (PineMul 100 (5 g.) and PineMul 201 (5 g.)) and mix in a Multimixer for two minutes.

Further add 5 g. Lime and mix in Multimixer for additional 5 minutes.

Further add 74.5 g. of CaCl2 brine (10.8 ppg concentration) and mix in Multimixer for additional 15 minutes.

Add 6 g. rheology additive (EXAMPLE #1) and 215 g Barite 4.1 and shear mix for 15 mins in a Rio Blender at high speed for another 15 minutes.

In Mineral Oil Based OBF

A 14 ppg, 80:20 OWR invert mineral oil drilling fluid

To 155.3 g. Escaid Mineral Oil add emulsifiers (PineMul 100 (8 g.) and PineMul 201 (5 g.)) and mix in a Multimixer for two minutes.

Further add 5 g. Lime and mix in Multimixer for additional 5 minutes.

Further add 63.7 g. of CaCl2 brine (10.8 ppg concentration) and mix in Multimixer for additional 15 minutes.

Add 4 g. rheology additive and 350 g Barite 4.1 and shear mix for 15 mins in a Rio Blender for another 15 minutes.

Occasionally, Field Fluids (actually used Drilling Fluids) were also used as the test OBF as opposed to using laboratory prepared Fluids. The Field Fluids have actually been circulated downhole and are either mineral oil or diesel based, containing cuttings and other impurities representing real world fluids and thereby demonstrating real world performance of the invention.

Testing OBF

Each OBF was subjected to

Initial Testing

After 16 hours dynamic aging (with hot rolling, HR) at three Target temperatures—250 F, 300 F, and 350 F. This testing is done to simulate downhole conditions Measuring OBF Performance The following parameters were measured for each sample, initially and after hot rolling—Fann rheology profile at 120 F at 600,300,6,3 rpms 10 sec, 10 min gels Electrical Stability (ES) at 120 F Brookfield Viscosity @0.5 rpm at 120 F Plastic Vicosity (PV) is a calculated value, with PV=Fann 600–Fann 300

Yield Point (YP) is a calculated value, with YP=Fann 300–PV

HPHT Fluid Loss was tested at 500 psi differential pressure at each Target temperature noting filtrate volume and filter cake thickness.

Comparative Performance Data

Whenever possible, the various embodiments of the invention were tested in OBFs, compounded as above, using industry standard HPHT rheological additives available in the market—RheoMinerals B92, Elementis BENTONE 38, and Elementis BENTONE 42.

Table 1 Bentone 38 vs Example 1 Preparation vs Bentone 42 in MINERAL OIL based OBF Table 1A Bentone 38 vs Example 1 vs Bentone 42 Preparation in DIESEL based OBF Table 1D Example 1 Preparation vs B92 in DIESEL based OBF

TABLE 1

BENTONE 38 vs. BENTONE 42 vs. EXAMPLE#1-GROUND MIXTURE OF 75% B92 & 25% OPI 1316 Tested in 12 ppg 80:20 OWR Diesel Fluid Hot Rolled 16 Hours @250 F., 300 F., 350 F. and HPHT Fluid Loss Tested @250 F., 300 F., 350 F. and 500 psi dP

| | | BENTONE 38 | 75% B92 #20040 + 25% OPI 1316 DRY MILLED & BLENDED | BENTONE 42 |
|---|---|---|---|---|
| Initial Shearing | Fann 600 rpm @120 F. | 90 | 61 | 48 |
| | 300 | 58 | 39 | 24 |
| | 6 | 17 | 10 | 2 |
| | 3 | 16 | 10 | 2 |
| | 10 sec Gel | 16 | 10 | 2 |
| | 10 min Gel | 17 | 10 | 3 |
| | PV | 32 | 22 | 24 |
| | YP | 26 | 17 | 0 |
| | Brookfield RVT 0.5 rpm | 41,920 | 21,200 | 2,800 |
| | ES (V) | 1,435 | 1,539 | 1,003 |
| Hot Rolled O/N @ 250 F. | Fann 600 rpm @120 F. | 75 | 66 | 49 |
| | 300 | 44 | 39 | 26 |
| | 6 | 9 | 10 | 2 |
| | 3 | 8 | 10 | 2 |
| | 10 sec Gel | 9 | 11 | 2 |
| | 10 min Gel | 9 | 13 | 2 |
| | PV | 31 | 27 | 23 |
| | YP | 13 | 12 | 3 |
| | Brookfield RVT 0.5 rpm | 26,960 | 40,560 | 2,560 |
| | ES (V) | 1,356 | 1,212 | 572 |
| | 250 F. HPHT FLUID LOSS (cc) | 0.4 | 0.3 | 1 |
| | Water (cc) | NONE | NONE | NONE |
| | Filtercake Thickness (inches) | 1/16 | 1/2+ | 1/2 |
| Hot Rolled O/N @ 300 F. | Fann 600 rpm @120 F. | 55 | 56 | 48 |
| | 300 | 30 | 32 | 24 |
| | 6 | 4 | 7 | 2 |
| | 3 | 3 | 7 | 1 |
| | 10 sec Gel | 3 | 7 | 1 |
| | 10 min Gel | 4 | 10 | 2 |
| | PV | 25 | 24 | 24 |
| | YP | 5 | 8 | 0 |
| | Brookfield RVT 0.5 rpm | 9280 | 26,960 | 1600 |
| | ES (V) | 757 | 500 | 327 |
| | 300 F. HPHT FLUID LOSS (cc) | 1.2 | 1.2 | 1.1 |
| | Water (cc) | NONE | NONE | NONE |
| | Filtercake Thickness (inches) | 1/2+ | 1/2+ | 3/4 |
| Hot Rolled O/N @ 350 F. | Fann 600 rpm @120 F. | 48 | 49 | 47 |
| | 300 | 23 | 26 | 23 |
| | 6 | 1 | 2 | 1 |
| | 3 | 1 | 2 | 1 |
| | 10 sec Gel | 1 | 3 | 1 |
| | 10 min Gel | 1 | 4 | 1 |
| | PV | 25 | 23 | 24 |
| | YP | -2 | 3 | -1 |
| | Brookfield RVT 0.5 rpm | 1,120 | 9,520 | 80 |
| | ES (V) | 499 | 289 | 244 |
| | 350 F. HPHT FLUID LOSS (cc) | 2.6 | 7.7 | 2 3/5 |
| | Water (cc) | NONE | NONE | NONE |
| | Filtercake Thickness (inches) | 1/2+ | 1 | 1 |
| 12 ppb 80:20 OWR INVERT DIESEL | | | | |
| | RED DIESEL | 194.8 | | |
| | PM 100 | 5 | 505.3 | |
| | PM 201 | 5 | | |
| | | MIX ON MULTIMIXER 2 MIXER | | |
| | LIME | 5 | | |
| | | MIX ON MULTIMIXER 5 MINUTES | | |

TABLE 1-continued

BENTONE 38 vs. BENTONE 42 vs. EXAMPLE#1-GROUND MIXTURE OF 75% B92 & 25% OPI 1316 Tested in 12 ppg 80:20 OWR Diesel Fluid Hot Rolled 16 Hours @250 F., 300 F., 350 F. and HPHT Fluid Loss Tested @250 F., 300 F., 350 F. and 500 psi dP

| | | |
|---|---|---|
| 10.8 ppg CaCl2 BRINE | 74.5 | |
| | MIX ON MULTIMIXER | 404.24 |
| | 15 MINUTES | |
| ORGANOCLAY/INVENTION | 6 | |
| BARTITE 4.1 | 215 | |
| | TRANSFER TO RIO BLENDER | |
| | SHEAR ON RIO BLENDER | |
| | 15 MINUTES | |
| | READ ES, Fann, | |
| | BROOKFIELD @120 F. | |
| | TRANSFER TO HOT | |
| | ROLL CYLINDER | |
| | & HR 16 Hrs. @250 F. | |
| | COOL TO APPROX. 150 F. | |
| | MIX ON MULTIMIXER | |
| | 5 MINUTES | |
| | COOL TO 120 F. | |
| | READ ES, Fann, | |
| | BROOKFIELD @120 F. | |
| | TRANSFER TO HPHT | |
| | FUID LOSS CYLINDER | |
| | READ HPHT FLUID | |
| | LOSS @TARGET | |
| | TEMPERATURE and 500psi dP | |

TABLE 1A

BENTONE 38 vs. BENTONE 42 vs. EXAMPLE#1-GROUND MIXTURE OF 75% FAST YIELDING ORGANOCLAY & 25% OPI 1316 (HDoxPE) Tested in 14 ppg 80:20 OWR Mineral Oil Fluid Hot Rolled 16 Hours @250 F., 300 F., 350 F. and HPHT Fluid Loss Tested @250 F., 300 F., 350 F. and 500 psi dP

| | | BENTONE 38 | 75% Fast Yielding Organoclay + 25% OPI 1316 (HDoxPE) DRY MILLED MIXTURE | BENTONE 42 |
|---|---|---|---|---|
| Initial Shearing | Fann 600 rpm @120 F. | 66 | 70 | 48 |
| | 300 | 41 | 43 | 25 |
| | 6 | 10 | 12 | 2 |
| | 3 | 9 | 11 | 2 |
| | 10 sec Gel | 9 | 12 | 2 |
| | 10 min Gel | 9 | 12 | 2 |
| | PV | 25 | 27 | 23 |
| | YP | 16 | 16 | 2 |
| | Brookfield RVT 0.5 rpm | 19,280 | 30,000 | 1,600 |
| | ES | 1,401 | 1,596 | 884 |
| Hot Rolled O/N @250 F. | Fann 600 rpm @120 F. | 91 | 77 | 54 |
| | 300 | 55 | 47 | 27 |
| | 6 | 8 | 7 | 2 |
| | 3 | 7 | 6 | 1 |
| | 10 sec Gel | 7 | 6 | 1 |
| | 10 min Gel | 8 | 9 | 1 |
| | PV | 36 | 30 | 27 |
| | YP | 19 | 17 | 0 |
| | Brookfield RVT 0.5 rpm | 19,840 | 8,080 | 0 |
| | ES | 940 | 1,052 | 575 |
| | 250 F. HPHT FLUID LOSS (cc) | 0.3 | 0.4 | 0.9 |
| | Water (cc) | NONE | NONE | NONE |
| | Filtercake Thickness (inches) | 1/2 | 1 | 3/4+ |
| Hot Rolled O/N @300 F. | Fann 600 rpm @120 F. | 48 | 51 | 48 |
| | 300 | 24 | 27 | 25 |
| | 6 | 1 | 2 | 1 |
| | 3 | 1 | 2 | 1 |
| | 10 sec Gel | 1 | 2 | 1 |
| | 10 min Gel | 1 | 5 | 1 |
| | PV | 24 | 24 | 23 |
| | YP | 0 | 3 | 2 |

TABLE 1A-continued

BENTONE 38 vs. BENTONE 42 vs. EXAMPLE#1-GROUND MIXTURE OF 75% FAST YIELDING
ORGANOCLAY & 25% OPI 1316 (HDoxPE) Tested in 14 ppg 80:20 OWR Mineral Oil Fluid Hot Rolled
16 Hours @250 F., 300 F., 350 F. and HPHT Fluid Loss Tested @250 F., 300 F., 350 F. and 500 psi dP

| | | | | |
|---|---|---|---|---|
| | Brookfield RVT 0.5 rpm | 0 | 7,840 | 0 |
| | ES | 428 | 408 | 352 |
| | 300 F. HPHT FLUID LOSS (cc) | 1 | 0.9 | 0.9 |
| | Water (cc) | NONE | NONE | NONE |
| | Filtercake Thickness (inches) | 3/4 | 3/4 | 3/4+ |
| Hot | Fann 600 rpm @120 F. | 55 | 75 | 56 |
| Rolled | 300 | 28 | 45 | 30 |
| O/N | 6 | 1 | 4 | 1 |
| @ 350 F. | 3 | 1 | 4 | 1 |
| | 10 sec Gel | 1 | 5 | 1 |
| | 10 min Gel | 1 | 6 | 1 |
| | PV | 27 | 30 | 26 |
| | YP | 1 | 15 | 4 |
| | Brookfield RVT 0.5 rpm | 400 | 10,720 | 480 |
| | ES | 273 | 329 | 218 |
| | 350 F. HPHT FLUID LOSS (cc) | 2.5 | 4 | 2 1/5 |
| | Water (cc) | NONE | NONE | NONE |
| | Filtercake Thickness (inches) | 1 | 11/8 | 1 |

14 ppb 80:20 OWR INVERT MINERAL OIL

| | |
|---|---|
| ESCAID 110 MINERAL OIL | 155.3 |
| PM 100 | 8 |
| PM 201 | 5 |
| | MIX ON MULTIMIXER 2 MIXER |
| LIME | 5 |
| | MIXON MULTIMIXER 5 MINUTES |
| 10.8 ppg CaCl2 BRINE | 63.7 |
| | MIX ON MULTIMIXER 15 MINUTES |
| ORGANOCLAY/INVENTION | 4 |
| | MIX ON MULTIMIXER 5 MINUTES |
| BARTITE 4.1 | 350 |
| | MIX ON MULTIMIXER 15 MINUTES |
| | TRANSFER TO RIO BLENDER |
| | SHEAR ON RIO BLENDER 15 MINUTES |
| | READ ES, Fann, BROOKFIELD @120 F. |
| | TRANSFER TO HOT ROLL CYLINDER & HR 16 Hrs. @250 F., 300 F., or 350 F. |
| | COOL TO APPROX. 150 F. |
| | MIX ON MULTIMIXER 5 MINUTES |
| | COOL TO 120 F. |
| | READ ES, Fann, BROOKFIELD @120 F. |
| | TRANSFER TO HPHT FUID LOSS CYLINDER |
| | READ HPHT FLUID LOSS @TARGET TEMPERATURE and 500psi dP |

TABLE 1D

100% B92 VS. EXAMPLE#1 - GROUND MIXTURE OF 75% B92 & 25% OPI 1316
Tested in 12 ppg 80:20 OWR Diesel Fluid Hot Rolled 16 Hours @250 F., 300 F., 350 F.
and HPHT Fluid Loss Tested @250 F., 300 F., 350 F. and 500 psi dP

| | | 100% B92 #20040 | 75% B92 #20040 + 25% OPI 1316 DRY MILLED & BLENDED |
|---|---|---|---|
| Initial | Fann 600 rpm @120 F. | 66 | 61 |
| | 300 | 44 | 39 |
| | 6 | 14 | 10 |
| | 3 | 13 | 10 |
| | 10 sec Gel | 13 | 10 |
| | 10 min Gel | 14 | 10 |
| | PV | 22 | 22 |
| | YP | 22 | 17 |
| | Brookfield RVT 0.5 rpm | 32,329 | 21,200 |
| | ES | 1,652 | 1,539 |
| Hot | Fann 600 rpm @120 F. | 54 | 66 |
| Rolled | 300 | 32 | 39 |
| O/N @ | 6 | 7 | 10 |
| 250 F. | 3 | 7 | 10 |
| | 10 sec Gel | 7 | 11 |
| | 10 min Gel | 7 | 13 |
| | PV | 22 | 27 |
| | YP | 10 | 12 |

TABLE 1D-continued

100% B92 VS. EXAMPLE#1 - GROUND MIXTURE OF 75% B92 & 25% OPI 1316
Tested in 12 ppg 80:20 OWR Diesel Fluid Hot Rolled 16 Hours @250 F., 300 F., 350 F.
and HPHT Fluid Loss Tested @250 F., 300 F., 350 F. and 500 psi dP

|  |  |  |  |
|---|---|---|---|
|  | Brookfield RVT 0.5 rpm | 17,120 | 40,560 |
|  | ES | 1,088 | 1,212 |
|  | 250 F. HPHT FLUID LOSS (cc) | 1.1 | 0.3 |
|  | Water (cc) | NONE | NONE |
|  | Filtercake Thickness (inches) | 1/16 | 1/2+ |
| Hot | Fann 600 rpm @120 F. | 40 | 56 |
| Rolled | 300 | 20 | 32 |
| O/N @ | 6 | 2 | 7 |
| 300 F. | 3 | 1 | 7 |
|  | 10 sec Gel | 1 | 7 |
|  | 10 min Gel | 1 | 10 |
|  | PV | 20 | 24 |
|  | YP | 0 | 8 |
|  | Brookfield RVT 0.5 rpm | 2,560 | 26,960 |
|  | ES | 300 | 500 |
|  | 300 F. HPHT FLUID LOSS (cc) | 2.2 | 1.2 |
|  | Water (cc) | NONE | NONE |
|  | Filtercake Thickness (inches) | 3/4 | 1/2+ |
| Hot | Fann 600 rpm @120 F. | 43 | 49 |
| Rolled | 300 | 21 | 26 |
| O/N @ | 6 | 1 | 2 |
| 350 F. | 3 | 1 | 2 |
|  | 10 sec Gel | 1 | 3 |
|  | 10 min Gel | 1 | 4 |
|  | PV | 22 | 23 |
|  | YP | −1 | 3 |
|  | Brookfield RVT 0.5 rpm | 1,760 | 9,520 |
|  | ES | 298 | 289 |
|  | 350 F. HPHT FLUID LOSS (cc) | 15 | 7.7 |
|  | Water (cc) | NONE | NONE |
|  | Filtercake Thickness (inches) | 1/2 | 1 |

| 12 ppb 80:20 OWR INVERT DIESEL | |
|---|---|
| RED DIESEL | 194.8 |
| PM 100 | 5 |
| PM 201 | 5 |
|  | MIX ON MULTIMIXER 2 MIXER |
| LIME | 5 |
|  | MIX ON MULTIMIXER 5 MINUTES |
| 10.8 ppg CaCl2 BRINE | 74.5 |
|  | MIX ON MULTIMIXER 15 MINUTES |
| ORGANOCLAY/INVENTION | 6 |
| BARTITE 4.1 | 215 |
|  | TRANSFER TO RIO BLENDER |
|  | SHEAR ON RIO BLENDER 15 MINUTES |
|  | READ ES, Fann, BROOKFIELD @120 F. |
|  | TRANSFER TO HOT ROLL CYLINDER & HR 16 Hrs. @250 F. |
|  | COOL TO APPROX. 150 F. |
|  | MIX ON MULTIMIXER 5 MINUTES |
|  | COOL TO 120 F. |
|  | READ ES, Fann, BROOKFIELD @120 F. |
|  | TRANSFER TO HPHT FUID LOSS CYLINDER |
|  | READ HPHT FLUID LOSS @TARGET TEMPERATURE and 500 psi dP |

EXAMPLE #2

Preparation of a composite rheological additive A composite of A-C 395A (HDoxPE with acid number=41) and fast yielding organoclay was prepared as follows:
(1) A heated KitchenAid mixing bowl @210 F was charged with 100 g A-C 395A and 125 g boiling distilled water.
(2) While mixing at low speed on a KitchenAid mixer 6 g of 50% NaOH was added to neutralize the acidity of the A-C 395A and mixed for 10 minutes.
(3) An additional 25 g of boiling distilled water and 120.7 g of molten (180 F) VARIQUAT B343 82E—Evonik (methyl benzyl dehydrogenated tallow ammonium chloride 82% active in ethanol/water) was added to the heated mixing bowl and allowed to mix for a further 15 minutes.
(4) 201 g dry (219.3 g @ 8.35% free moisture) Wyoming bentonite was then added and allowed to mix for an additional 15 minutes.
(5) During the final 15 minutes mixing, 75 g of additional boiling distilled water was added in three 25 g increments, after approximately 4, 8, and 12 minutes.
(6) The resulting mixture was then run twice through a Thunderbird Meat Grinder to simulate two passes through an extruder. The extrudates were then dried in a lab convection oven at 110 C to under 4% free moisture. The dry extrudates were then ground in a lab IKA hammer mill and screened to 100% minus 325 mesh. Screening does not segregate the HDoxPE and organoclay in this case as the HDoxPE is uniformly deposited over the surface of the organoclay.

Preparation, Testing & Evaluating of OBF with comparative controls was done.

Table 2 Bentone 38, vs Example 2 Preparation vs Bentone 42 Preparation in DIESEL based OBF Table 2A Bentone 38, Example 2 Preparation, vs Bentone 42 in MINERAL OIL based OBF

TABLE 2

BENTONE 38 vs. BENTONE 42 vs. EXAMPLE#2 - 25% A-C 395A + 75% ORGANOCLAY COMPOSITE VIA EMULSION
Tested in 12 ppg 80:20 OWR Diesel Fluid Hot Rolled 16 Hours @250 F., 300 F., 350 F. and HPHT Fluid Loss Tested @250 F., 300 F., 350 F. and 500 psi dP

| | | BENTONE 38 | 25% A-C 395A + 75% ORGANOCLAY COMPOSITE VIA EMULSION | BENTONE 42 |
|---|---|---|---|---|
| Initial | Fann 600 rpm @120 F. | 90 | 66 | 48 |
| | 300 | 58 | 41 | 24 |
| | 6 | 17 | 12 | 2 |
| | 3 | 16 | 10 | 2 |
| | 10 sec Gel | 16 | 10 | 2 |
| | 10 min Gel | 17 | 11 | 3 |
| | PV | 32 | 25 | 24 |
| | YP | 26 | 16 | 0 |
| | Brookfield RVT 0.5 rpm | 41,920 | 24,240 | 2,800 |
| | ES | 1,435 | 1,723 | 1,003 |
| Hot Rolled O/N @ 250 F. | Fann 600 rpm @120 F. | 75 | 64 | 49 |
| | 300 | 44 | 38 | 26 |
| | 6 | 9 | 9 | 2 |
| | 3 | 8 | 9 | 2 |
| | 10 sec Gel | 9 | 9 | 2 |
| | 10 min Gel | 9 | 10 | 2 |
| | PV | 31 | 26 | 23 |
| | YP | 13 | 12 | 3 |
| | Brookfield RVT 0.5 rpm | 26,960 | 31,120 | 2,560 |
| | ES | 1,356 | 1,296 | 572 |
| | 250 F. HPHT FLUID LOSS (cc) | 0.4 | 1.1 | 1 |
| | Water (cc) | NONE | NONE | NONE |
| | Filtercake Thickness (inches) | 1/16 | 1/8 | 1/2 |
| Hot Rolled O/N @ 300 F. | Fann 600 rpm @120 F. | 55 | 51 | 48 |
| | 300 | 30 | 28 | 24 |
| | 6 | 4 | 4 | 2 |
| | 3 | 3 | 4 | 1 |
| | 10 sec Gel | 3 | 4 | 1 |
| | 10 min Gel | 4 | 6 | 2 |
| | PV | 25 | 23 | 24 |
| | YP | 5 | 5 | 0 |
| | Brookfield RVT 0.5 rpm | 9280 | 15,520 | 1600 |
| | ES | 757 | 521 | 327 |
| | 300 F. HPHT FLUID LOSS (cc) | 1.2 | 1.5 | 1.1 |
| | Water (cc) | NONE | NONE | NONE |
| | Filtercake Thickness (inches) | 1/2+ | 3/4 | 3/4 |
| Hot Rolled 350 F. | Fann 600 rpm @120 F. | 48 | 44 | 47 |
| | 300 | 23 | 22 | 23 |
| | 6 | 1 | 2 | 1 |
| | 3 | 1 | 2 | 1 |
| | 10 sec Gel | 1 | 2 | 1 |
| | 10 min Gel | 1 | 2 | 1 |
| | PV | 25 | 22 | 24 |
| | YP | -2 | 0 | -1 |
| | Brookfield RVT 0.5 rpm | 1,120 | 4,240 | 80 |
| | ES | 499 | 292 | 244 |
| | 350 F. HPHT FLUID LOSS (cc) | 2.6 | 42 | 2.6 |
| | Water (cc) | NONE | 4 cc Water | NONE |
| | Filtercake Thickness (inches) | 1/2+ | 1 1/2 | 1 |

| 12 ppb 80:20 OWR INVERT DIESEL | |
|---|---|
| RED DIESEL | 194.8 |
| PM 100 | 5 |
| PM 201 | 5 |
| | MIX ON MULTIMIXER 2 MIXER |
| LIME | 5 |
| | MIX ON MULTIMIXER 5 MINUTES |
| 10.8 ppg CaCl2 BRINE | 74.5 |
| | MIX ON MULTIMIXER 15 MINUTES |
| ORGANOCLAY/INVENTION | 6 |
| | MIX ON MULTIMIXER 5 MINUTES |
| BARTITE 4.1 | 215 |
| | MIX ON MULTIMIXER 15 MINUTES |
| | TRANSFER TO RIO BLENDER |
| | SHEAR ON RIO BLENDER 15 MINUTES |
| | READ ES, Fann, BROOKFIELD @120 F. |

TABLE 2-continued

BENTONE 38 vs. BENTONE 42 vs. EXAMPLE#2 - 25% A-C 395A + 75% ORGANOCLAY
COMPOSITE VIA EMULSION
Tested in 12 ppg 80:20 OWR Diesel Fluid Hot Rolled 16 Hours @250 F., 300 F., 350 F.
and HPHT Fluid Loss Tested @250 F., 300 F., 350 F. and 500 psi dP TRANSFER TO HOT ROLL CYLINDER & HR 16 Hrs. @250 F., 300 F., or 350 F.
COOL TO APPROX. 150 F.
MIX ON MULTIMIXER 5 MINUTES
COOL TO 120 F.
READ ES, Fann, BROOKFIELD @120 F.
TRANSFER TO HPHT FUID LOSS CYLINDER
READ HPHT FLUID LOSS @TARGET TEMPERATURE and 500 psi dP

TABLE 2A

BENTONE 38 vs. BENTONE 42 vs. EXAMPLE #2 - 25% A-C 395A/75% ORGANOCLAY
COMPOSITE VIA EMULSION
Tested in 14 ppg 80:20 OWR Mineral Oil Fluid Hot Rolled 16 Hours @250 F., 300 F., 350 F.
and HPHT Fluid Loss Tested @250 F., 300 F., 350 F. and 500 psi dP

|   |   | BENTONE 38 | 25% A-C 395A/75% ORGANOCLAY COMPOSITE VIA EMULSION | BENTONE 42 |
|---|---|---|---|---|
| Initial | Fann 600 rpm @120 F. | 66 | 74 | 48 |
|  | 300 | 41 | 46 | 25 |
|  | 6 | 10 | 13 | 2 |
|  | 3 | 9 | 12 | 2 |
|  | 10 sec Gel | 9 | 12 | 2 |
|  | 10 min Gel | 9 | 13 | 2 |
|  | PV | 25 | 28 | 23 |
|  | YP | 16 | 18 | 2 |
|  | Brookfield RVT 0.5 rpm | 19,280 | 30,640 | 1,600 |
|  | ES | 1,401 | 1,426 | 884 |
| Hot Rolled O/N @ 250 F. | Fann 600 rpm @120 F. | 91 | 63 | 54 |
|  | 300 | 55 | 34 | 27 |
|  | 6 | 8 | 2 | 2 |
|  | 3 | 7 | 2 | 1 |
|  | 10 sec Gel | 7 | 2 | 1 |
|  | 10 min Gel | 8 | 4 | 1 |
|  | PV | 36 | 29 | 27 |
|  | YP | 19 | 5 | 0 |
|  | Brookfield RVT 0.5 rpm | 19,840 | 1,680 | 0 |
|  | ES | 940 | 761 | 575 |
|  | 250 F. HPHT FLUID LOSS (cc) | 0.3 | 0.5 | 0.9 |
|  | Water (cc) | NONE | NONE | NONE |
|  | Filtercake Thickness (inches) | ½ | ¾ | ¾+ |
| Hot Rolled O/N @ 300 F. | Fann 600 rpm @120 F. | 48 | 50 | 48 |
|  | 300 | 24 | 25 | 25 |
|  | 6 | 1 | 1 | 1 |
|  | 3 | 1 | 1 | 1 |
|  | 10 sec Gel | 1 | 1 | 1 |
|  | 10 min Gel | 1 | 2 | 1 |
|  | PV | 24 | 25 | 23 |
|  | YP | 0 | 0 | 2 |
|  | Brookfield RVT 0.5 rpm | 0 | 3,920 | 0 |
|  | ES | 428 | 421 | 352 |
|  | 300 F. HPHT FLUID LOSS (cc) | 1 | 1.4 | 0.9 |
|  | Water (cc) | NONE | NONE | NONE |
|  | Filtercake Thickness (inches) | ¾ | ¾ | ¾+ |
| Hot Rolled O/N @ 350 F. | Fann 600 rpm @120 F. | 55 | 54 | 56 |
|  | 300 | 28 | 28 | 30 |
|  | 6 | 1 | 3 | 1 |
|  | 3 | 1 | 3 | 1 |
|  | 10 sec Gel | 1 | 3 | 1 |
|  | 10 min Gel | 1 | 3 | 1 |
|  | PV | 27 | 26 | 26 |
|  | YP | 1 | 2 | 4 |
|  | Brookfield RVT 0.5 rpm | 400 | 5,360 | 480 |
|  | ES | 273 | 309 | 218 |
|  | 350 F. HPHT FLUID LOSS (cc) | 2.5 | 2.9 | 2.2 |
|  | Water (cc) | NONE | NONE | NONE |
|  | Filtercake Thickness (inches) | 1 | ¾ | 1 |

TABLE 2A-continued

BENTONE 38 vs. BENTONE 42 vs. EXAMPLE #2 - 25% A-C 395A/75% ORGANOCLAY
COMPOSITE VIA EMULSION
Tested in 14 ppg 80:20 OWR Mineral Oil Fluid Hot Rolled 16 Hours @250 F., 300 F., 350 F.
and HPHT Fluid Loss Tested @250 F., 300 F., 350 F. and 500 psi dP

| 14 ppb 80:20 OWR INVERT MINERAL OIL | |
|---|---|
| ESCAID 110 MINERAL OIL | 155.3 |
| PM 100 | 8 |
| PM 201 | 5 |
| | MIX ON MULTIMIXER 2 MIXER |
| LIME | 5 |
| | MIX ON MULTIMIXER 5 MINUTES |
| 10.8 ppg CaCl2 BRINE | 63.7 |
| | MIX ON MULTIMIXER 15 MINUTES |
| ORGANOCLAY/COMPOSITE | 4 |
| | MIX ON MULTIMIXER 5 MINUTES |
| BARTITE 4.1 | 350 |
| | MIX ON MULTIMIXER 15 MINUTES |
| | TRANSFER TO RIO BLENDER |
| | SHEAR ON RIO BLENDER 15 MINUTES |
| | READ ES, Fann, BROOKFIELD @120 F. |
| | TRANSFER TO HOT ROLL CYLINDER & HR 16 Hrs. @250 F., 300 F., or 350 F. |
| | COOL TO APPROX. 150 F. |
| | MIX ON MULTIMIXER 5 MINUTES |
| | COOL TO 120 F. |
| | READ ES, Fann, BROOKFIELD @120 F. |
| | TRANSFER TO HPHT FUID LOSS CYLINDER |
| | READ HPHT FLUID LOSS @TARGET TEMPERATURE and 500 psi dP |

EXAMPLE #3

Preparation of a Powder Low Shear Rheology Modifier

A uniform blend of 75%/25% on a dry basis RheoMinerals RM99 organoclay pellets and OPI 1316 high density oxidized polyethylene granules was ground in a Lab IKA Hammer Mill. The ground mixture was screened through a 60 mesh screen in order to remove any large agglomerates. Care was taken when handling the ground organoclay/HDoxPE mixture to ensure that downstream screening did not segregate any HDoxPE particles from the finer organoclay fraction.

RM 99 Plus and BENTONE 990 organoclay rheological modifiers were used as controls since the organoclay/HDoxPE mixture produced in this example is a low shear rheology modifier.

Preparation of OBF, Testing of OBF & Evaluating of OBF with controls was done.

Table 3 B92/Bentone 990 vs B92/Example 3 Preparation vs B92/RM 99 Plus in Diesel based OBF Table 3A B92/Bentone 990 vs B92/Example 3 Preparation vs B92/RM 99 Plus in Mineral Oil based OBF

TABLE 3

B92 + BENTONE 990 vs. B92 + EXAMPLE#3 vs. Clay Rheology Modifier
Tested in 12 ppg 80:20 OWR Diesel Fluid Hot Rolled 16 Hours @250 F., 300 F., 350 F.
and HPHT Fluid Loss Tested @250 F., 300 F., 350 F. and 500 psi dP

| | | 4 g B92 +<br>4 g BENTONE 990 | 4 g B92 +<br>4 g EXAMPLE #3<br>(25% OPI 1316 +<br>75% Clay Rheology<br>Modifier | 4 g B92 +<br>4 g Clay Rheology<br>Modifier |
|---|---|---|---|---|
| Initial | Fann 600 rpm @120 F. | 59 | 72 | 76 |
| | 300 | 37 | 48 | 51 |
| | 6 | 8 | 16 | 18 |
| | 3 | 8 | 15 | 17 |
| | 10 sec Gel | 8 | 15 | 17 |
| | 10 min Gel | 8 | 15 | 17 |
| | PV | 22 | 24 | 25 |
| | YP | 15 | 24 | 26 |
| | Brookfield RVT 0.5 rpm | 16,960 | 36,480 | 41,760 |
| | ES | 1,653 | 1,647 | 1,781 |
| Hot Rolled O/N @ 250 F. | Fann 600 rpm @120 F. | 52 | 82 | 64 |
| | 300 | 31 | 52 | 42 |
| | 6 | 6 | 20 | 12 |
| | 3 | 6 | 19 | 11 |
| | 10 sec Gel | 6 | 23 | 11 |
| | 10 min Gel | 6 | 25 | 11 |
| | PV | 21 | 30 | 22 |
| | YP | 10 | 22 | 20 |
| | Brookfield RVT 0.5 rpm | 13,280 | 62,000 | 25,760 |

TABLE 3-continued

B92 + BENTONE 990 vs. B92 + EXAMPLE#3 vs. Clay Rheology Modifier
Tested in 12 ppg 80:20 OWR Diesel Fluid Hot Rolled 16 Hours @250 F., 300 F., 350 F.
and HPHT Fluid Loss Tested @250 F., 300 F., 350 F. and 500 psi dP

| | | | | |
|---|---|---|---|---|
| | ES | 842 | 1,172 | 946 |
| | 250 F. HPHT FLUID LOSS (cc) | 1.6 | 1 | 1.8 |
| | Water (cc) | NONE | NONE | NONE |
| | Filtercake Thickness (inches) | 1/16 | 1/4 | 1/8 |
| Hot | Fann 600 rpm @120 F. | 42 | 64 | 51 |
| Rolled | 300 | 22 | 38 | 27 |
| O/N @ | 6 | 3 | 12 | 4 |
| 300 F. | 3 | 2 | 12 | 3 |
| | 10 sec Gel | 2 | 13 | 3 |
| | 10 min Gel | 2 | 14 | 3 |
| | PV | 21 | 26 | 24 |
| | YP | 1 | 12 | 3 |
| | Brookfield RVT 0.5 rpm | 5280 | 46,960 | 8320 |
| | ES | 489 | 537 | 496 |
| | 300 F. HPHT FLUID LOSS (cc) | 4.9 | 1.9 | 11.0 |
| | Water (cc) | NONE | NONE | NONE |
| | Filtercake Thickness (inches) | 1/4 | 1/2 | 1/4 |
| Hot | Fann 600 rpm @120 F. | 45 | 67 | 62 |
| Rolled | 300 | 23 | 40 | 35 |
| O/N @ | 6 | 2 | 14 | 4 |
| 350 F. | 3 | 2 | 14 | 4 |
| | 10 sec Gel | 2 | 14 | 4 |
| | 10 min Gel | 2 | 15 | 4 |
| | PV | 22 | 27 | 27 |
| | YP | 1 | 13 | 8 |
| | Brookfield RVT 0.5 rpm | 4,480 | 51,920 | 9,280 |
| | ES | 332 | 508 | 420 |
| | 350 F. HPHT FLUID LOSS (cc) | 3.8 | 9.6 | 13 |
| | Water (cc) | NONE | NONE | NONE |
| | Filtercake Thickness (inches) | 1/4 | 1 1/4 | 1/2 |

12 ppb 80:20 OWR INVERT DIESEL

| | |
|---|---|
| RED DIESEL | 194.8 |
| PM 100 | 5 |
| PM 201 | 5 |
| | MIX ON MULTIMIXER 2 MIXER |
| LIME | 5 |
| | MIX ON MULTIMIXER 5 MINUTES |
| 10.8 ppg CaCl2 BRINE | 74.5 |
| | MIX ON MULTIMIXER 15 MINUTES |
| CONVENTIONAL ORGANOCLAY | 4 |
| RHEOLOGY MODIFIER | 4 |
| | MIX ON MULTIMIXER 5 MINUTES |
| BARTITE 4.1 | 215 |
| | MIX ON MULTIMIXER 15 MINUTES |
| | TRANSFER TO RIO BLENDER |
| | SHEAR ON RIO BLENDER 15 MINUTES |
| | READ ES, Fann, BROOKFIELD @120 F. |
| | TRANSFER TO HOT ROLL CYLINDER & HR 16 Hrs. @250 F., 300 F., or 350 F.. |
| | COOL TO APPROX. 150 F. |
| | MIX ON MULTIMIXER5 MINUTES |
| | COOL TO 120 F. |
| | READ ES, Fann, BROOKFIELD @120 F. |
| | TRANSFER TO HPHT FUID LOSS CYLINDER |
| | READ HPHT FLUID LOSS @TARGET TEMPERATURE and 500 psi dP |

TABLE 3A

EXAMPLE #3a
B92 + BENTONE 990 vs. B92 + EXAMPLE#3 vs. B92 + Clay Rheology Modifier
Tested in 14 ppg 80:20 OWR Mineral Oil Fluid Hot Rolled 16 Hours @250 F., 300 F., 350 F.
and HPHT Fluid Loss Tested @250 F., 300 F., 350 F. and 500 psi dP

| | | 3 g B92-v 3 g BENTONE 990 | 3 g B92 + 3 g EXAMPLE #3 (25% OPI 1316 + 75% RM Clay Rheology Modifier) | 3 g B92 + 3 g RM 99 Plus |
|---|---|---|---|---|
| Initial | Fann 600 rpm @120 F. | 66 | 84 | 90 |
| | 300 | 38 | 54 | 58 |
| | 6 | 8 | 16 | 17 |

TABLE 3A-continued

EXAMPLE #3a
B92 + BENTONE 990 vs. B92 + EXAMPLE#3 vs. B92 + Clay Rheology Modifier
Tested in 14 ppg 80:20 OWR Mineral Oil Fluid Hot Rolled 16 Hours @250 F., 300 F., 350 F.
and HPHT Fluid Loss Tested @250 F., 300 F., 350 F. and 500 psi dP

|   |   | | | |
|---|---|---:|---:|---:|
|   | 3 | 8 | 15 | 16 |
|   | 10 sec Gel | 8 | 15 | 16 |
|   | 10 min Gel | 8 | 15 | 16 |
|   | PV | 28 | 30 | 32 |
|   | YP | 10 | 24 | 26 |
|   | Brookfield RVT 0.5 rpm | 17,440 | 38,800 | 41,760 |
|   | ES | 1,233 | 1,362 | 1,458 |
| Hot | Fann 600 rpm @120 F. | 54 | 98 | 68 |
| Rolled | 300 | 28 | 63 | 39 |
| O/N @ | 6 | 2 | 16 | 6 |
| 250 F. | 3 | 2 | 16 | 5 |
|   | 10 sec Gel | 2 | 17 | 5 |
|   | 10 min Gel | 2 | 19 | 5 |
|   | PV | 26 | 35 | 29 |
|   | YP | 2 | 28 | 10 |
|   | Brookfield RVT 0.5 rpm | 3,360 | 52,480 | 12,320 |
|   | ES | 785 | 1,284 | 956 |
|   | 250 F. HPHT FLUID LOSS (cc) | 0.7 | 0.7 | 0.8 |
|   | Water (cc) | NONE | NONE | NONE |
| Hot | Fann 600 rpm @120 F. | 47 | 66 | 54 |
| Rolled | 300 | 22 | 37 | 27 |
| O/N @ | 6 | 1 | 5 | 2 |
| 300 F. | 3 | 1 | 5 | 2 |
|   | 10 sec Gel | 1 | 5 | 2 |
|   | 10 min Gel | 1 | 7 | 2 |
|   | PV | 25 | 29 | 27 |
|   | YP | -3 | 8 | 0 |
|   | Brookfield RVT 0.5 rpm | 1440 | 20,640 | 3360 |
|   | ES | 395 | 480 | 445 |
|   | 300 F. HPHT FLUID LOSS (cc) | 1.6 | 1.2 | 1.9 |
|   | Water (cc) | NONE | NONE | NONE |
|   | Filtercake Thickness (inches) | ½ | 1 | ½ |
| Hot | Fann 600 rpm @120 F. | 69 | 85 | 83 |
| Rolled | 300 | 40 | 50 | 47 |
| O/N @ | 6 | 3 | 9 | 4 |
| 350 F. | 3 | 2 | 9 | 3 |
|   | 10 sec Gel | 2 | 9 | 3 |
|   | 10 mm Gel | 2 | 11 | 3 |
|   | PV | 29 | 35 | 36 |
|   | YP | 11 | 15 | 11 |
|   | Brookfield RVT 0.5 rpm | 4,560 | 27,440 | 5,440 |
|   | ES | 304 | 399 | 381 |
|   | 350 F. HPHT FLUID LOSS (cc) | 3.8 | 9.6 | 13 |
|   | Water (cc) | NONE | NONE | NONE |
|   | Filtercake Thickness (inches) | ¼ | 1¼ | ½ |

14 ppb 80:20 OWR INVERT MINERAL OIL

ESCAID 110 MINERAL OIL

| | |
|---|---|
| PM 100 | 8 |
| PM 201 | 5 |
| | MIX ON MULTIMIXER 2 MIXER |
| LIME | 5 |
| | MIX ON MULTIMIXER 5 MINUTES |
| 10.8 ppg CaCl2 BRINE | |
| | MIX ON MULTIMIXER 15 MINUTES |
| CONVENTIONAL ORGANOCLAY | 3 |
| RHEOLOGY MODIFIER | 3 |
| | MIX ON MULTIMIXER 5 MINUTES |
| BARTITE 4.1 | 450 |
| | MIX ON MULTIMIXER 15 MINUTES |
| | TRANSFER TO RIO BLENDER |
| | SHEAR ON RIO BLENDER 15 MINUTES |
| | READ ES, Fann, BROOKFIELD @120 F. |
| | TRANSFER TO HOT ROLL CYLINDER & HR 16 Hrs. @250 F., 300 F., or 350 F. |
| | COOL TO APPROX. 150 F. |
| | MIX ON MULTIMIXER 5 MINUTES |
| | COOL TO 120 F. |
| | READ ES, Fann, BROOKFIELD @120 F. |
| | TRANSFER TO HPHT FUID LOSS CYLINDER |
| | READ HPHT FLUID LOSS @TARGER TEMPERATURE and 500 psi dP |

EXAMPLE #4

Preparation of Oxidized Polyethylene Rheology Additive

A-C 395A was mechanically ground in the lab by placing A-C 395A in a freezer for an hour then grinding the "frozen" A-C 395A granules through a lab IKA hammermill. The milled A-C 395A was then sieved on a Ro-Tap through a 325 mesh screen. The minus 325 mesh fraction was collected and the "overs" were re-frozen, re-ground, and re-sieved. The yield of minus 325 product was very low for each cycle. After several cycles sufficient minus 325 mesh A-C 395A fraction was collected. As previously mentioned, the A-C 395A could be cryogenically ground for commercial use.

Preparation of OBF, Testing of OBF & Evaluating of OBF with comparative controls was done as in Example 1. Table 4 and Table 4A tabulate the results.

Table 4 Bentone 38 vs B92/Example 4 Preparation vs Bentone 42 in Diesel based OBF Table 4A Bentone 38 vs B92/Example 4 Preparation vs Bentone 42 in Mineral Oil based OBF

TABLE 4

BENTONE 38 vs. BENTONE 42 vs. EXAMPLE #4 - 1.5 g GROUND A-C 395A + 4.5 g B92
Tested in 12 ppg 80:20 OWR Diesel Fluid Hot Rolled 16 Hours @250 F., 300 F., 350 F.
and HPHT Fluid Loss Tested @250 F., 300 F., 350 F. and 500 psi dP

| | | BENTONE 38 | 1.5 g Ground A-C 395A + 4.5 g B92 | BENTONE 42 |
|---|---|---|---|---|
| Initial | Fann 600 rpm @120 F. | 90 | 66 | 48 |
| | 300 | 58 | 39 | 24 |
| | 6 | 17 | 11 | 2 |
| | 3 | 16 | 10 | 2 |
| | 10 sec Gel | 16 | 10 | 2 |
| | 10 min Gel | 17 | 11 | 3 |
| | PV | 32 | 27 | 24 |
| | YP | 26 | 12 | 0 |
| | Brookfield RVT 0.5 rpm | 41,920 | 23,280 | 2,800 |
| | ES | 1,435 | 1,652 | 1,003 |
| Hot Rolled O/N @ 250 F. | Fann 600 rpm @120 F. | 75 | 79 | 49 |
| | 300 | 44 | 46 | 26 |
| | 6 | 9 | 12 | 2 |
| | 3 | 8 | 12 | 2 |
| | 10 sec Gel | 9 | 13 | 2 |
| | 10 min Gel | 9 | 13 | 2 |
| | PV | 31 | 33 | 23 |
| | YP | 13 | 13 | 3 |
| | Brookfield RVT 0.5 rpm | 26,960 | 25,680 | 2,560 |
| | ES | 1,356 | 1,538 | 572 |
| | 250 F. HPHT FLUID LOSS (cc) | 0.4 | 0.2 | 1 |
| | Water (cc) | NONE | NONE | NONE |
| | Filtercake Thickness (inches) | 1/16 | 1/2+ | 1/2 |
| Hot Rolled O/N @ 300 F. | Fann 600 rpm (®120 F. | 55 | 52 | 48 |
| | 300 | 30 | 28 | 24 |
| | 6 | 4 | 2 | 2 |
| | 3 | 3 | 2 | 1 |
| | 10 sec Gel | 3 | 3 | 1 |
| | 10 min Gel | 4 | 8 | 2 |
| | PV | 25 | 24 | 24 |
| | YP | 5 | 4 | 0 |
| | Brookfield RVT 0.5 rpm | 9280 | 20,480 | 1600 |
| | ES | 757 | 401 | 327 |
| | 300 F. HPHT FLUID LOSS (cc) | 1.2 | 1.3 | 1.1 |
| | Water (cc) | NONE | NONE | NONE |
| | Filtercake Thickness (inches) | 1/2+ | 1/2 | 3/4 |
| Hot Rolled O/N @ 350 F. | Fann 600 rpm @120 F. | 48 | | 47 |
| | 300 | 23 | | 23 |
| | 6 | 1 | | 1 |
| | 3 | 1 | | 1 |
| | 10 sec Gel | 1 | | 1 |
| | 10 min Gel | 1 | | 1 |
| | PV | 25 | | 24 |
| | YP | −2 | | −1 |
| | Brookfield RVT 0.5 rpm | 1,120 | | 80 |
| | ES | 499 | | 244 |
| | 350 F. HPHT FLUID LOSS (cc) | 2.6 | | 2 3/5 |
| | Water (cc) | NONE | | NONE |
| | Filtercake Thickness (inches) | 1/2+ | | 1 |

TABLE 4-continued

BENTONE 38 vs. BENTONE 42 vs. EXAMPLE #4 - 1.5 g GROUND A-C 395A + 4.5 g B92
Tested in 12 ppg 80:20 OWR Diesel Fluid Hot Rolled 16 Hours @250 F., 300 F., 350 F.
and HPHT Fluid Loss Tested @250 F., 300 F., 350 F. and 500 psi dP

12 ppb 80:20 OWR INVERT DIESEL

| | |
|---|---|
| RED DIESEL | 194.8 |
| PM 100 | 5 |
| PM 201 | 5 |
| | MIX ON MULTIMIXER 2 MIXER |
| LIME | 5 |
| | MIX ON MULTIMIXER 5 MINUTES |
| 10.8 ppg CaCl2 BRINE | 74.5 |
| | MIX ON MULTIMIXER 15 MINUTES |
| ORGANOCLAY | 6 |
| BARTITE 4.1 | 215 |
| | MIX ON MULTIMIXER 15 MINUTES |
| | TRANSFER TO RIO BLENDER |
| | SHEAR ON RIO BLENDER 15 MINUTES |
| | READ ES, Fann, BROOKFIELD @120 F. |
| | TRANSFER TO HOT ROLL CYLINDER & HR 16 Hrs. @250 F. |
| | COOL TO APPROX. 150 F. |
| | MIX ON MULTIMIXER 5 MINUTES |
| | COOL TO 120 F. |
| | READ ES, Fann, BROOKFIELD @120 F. |
| | TRANSFER TO HPHT FUID LOSS CYLINDER |
| | READ HPHT FLUID LOSS @TARGET TEMPERATURE and 500 psi dP |

TABLE 4A

BENTONE 38 vs. BENTONE42 Vs. EXAMPLE #4a - 1 g GROUND A-C 395A + 3 g B92
Tested in 12 ppg 80:20 OWR Mineral Oil Fluid Hot Rolled 16 Hours @250 F., 300 F., 350 F.
and HPHT Fluid Loss Tested @250 F., 300 F., 350 F. and 500 psi dP

| | | BENTONE 38 | 1 g Ground A-C 395A + 3 g B92 | BENTONE 42 |
|---|---|---|---|---|
| Initial | Fann 600 rpm @120 F. | 66 | 70 | 48 |
| | 300 | 41 | 44 | 25 |
| | 6 | 10 | 13 | 2 |
| | 3 | 9 | 12 | 2 |
| | 10 sec Gel | 9 | 12 | 2 |
| | 10 min Gel | 9 | 13 | 2 |
| | PV | 25 | 26 | 23 |
| | YP | 16 | 18 | 2 |
| | Brookfield RVT 0.5 rpm | 19,280 | 31,040 | 1,600 |
| | ES | 1,401 | 1,486 | 884 |
| Hot Rolled O/N @ 250 F. | Fann 600 rpm @120 F. | 91 | 65 | 54 |
| | 300 | 55 | 36 | 27 |
| | 6 | 8 | 5 | 2 |
| | 3 | 7 | 4 | 1 |
| | 10 sec Gel | 7 | 4 | 1 |
| | 10 min Gel | 8 | 6 | 1 |
| | PV | 36 | 29 | 27 |
| | YP | 19 | 7 | 0 |
| | Brookfield RVT 0.5 rpm | 19,840 | 5,120 | 0 |
| | 250 F. HPHT FLUID LOSS (cc) | 0.3 | 0.6 | 0.9 |
| | Water (cc) | NONE | NONE | NONE |
| | Filtercake Thickness (inches) | ½ | 1 | ¾+ |
| Hot Rolled O/N @ 300 F. | Fann 600 rpm @120 F. | 48 | 57 | 48 |
| | 300 | 24 | 29 | 25 |
| | 6 | 1 | 2 | 1 |
| | 3 | 1 | 2 | 1 |
| | 10 sec Gel | 1 | 2 | 1 |
| | 10 min Gel | 1 | 5 | 1 |
| | PV | 24 | 28 | 23 |
| | YP | 0 | 1 | 2 |
| | Brookfield RVT 0.5 rpm | 0 | 5,280 | 0 |
| | ES | 428 | 468 | 352 |
| | 300 F. HPHT FLUID LOSS (cc) | 1 | 0.9 | 0.9 |
| | Water (cc) | NONE | NONE | NONE |
| | Filtercake Thickness (inches) | ¾ | ¾ | ¾+ |

TABLE 4A-continued

BENTONE 38 vs. BENTONE42 Vs. EXAMPLE #4a - 1 g GROUND A-C 395A + 3 g B92
Tested in 12 ppg 80:20 OWR Mineral Oil Fluid Hot Rolled 16 Hours @250 F., 300 F., 350 F.
and HPHT Fluid Loss Tested @250 F., 300 F., 350 F. and 500 psi dP

| | | | | |
|---|---|---|---|---|
| Hot | Fann 600 rpm @120 F. | 55 | 54 | 56 |
| Rolled | 300 | 28 | 28 | 30 |
| O/N @ | 6 | 1 | 2 | 1 |
| 350 F. | 3 | 1 | 2 | 1 |
| | 10 sec Gel | 1 | 3 | 1 |
| | 10 min Gel | 1 | 4 | 1 |
| | PV | 27 | 26 | 26 |
| | YP | 1 | 2 | 4 |
| | Brookfield RVT 0.5 rpm | 400 | 9,520 | 480 |
| | ES | 273 | 300 | 218 |
| | 350 F. HPHT FLUID LOSS (cc) | 2.5 | 2.2 | 2.2 |
| | Water (cc) | NONE | NONE | NONE |
| | Filtercake Thickness (inches) | 1 | 1 | 1 |

14 ppb 80:20 OWR INVERT MINERAL OIL FLUID

ESCAID110 MINERAL OIL

| | | | |
|---|---|---|---|
| PM 100 | 8 | 8 | 8 |
| PM 201 | 5 | 5 | 5 |
| | MIX ON MULTIMIXER 2 MIXER | | |
| LIME | 5 | 5 | 5 |
| | MIX ON MULTIMIXER 5 MINUTES | | |
| 10.8 ppg CaCl2 BRINE | | | |
| | MIX ON MULTIMIXER 15 MINUTES | | |
| ORGANOCLAY | 4 | 3 | 4 |
| GROUND A-C 395A | | 1 | |
| | MIX ON MULTIMIXER 5 MINUTES | | |
| BARTITE 4.1 | 350 | 350 | 350 |
| | MIX ON MULTIMIXER 15 MINUTES | | |
| | TRANSFER TO RIO BLENDER | | |
| | SHEAR ON RIO BLENDER 15 MINUTES | | |
| | READ ES, Fann, BROOKFIELD @120 F. | | |
| | TRANSFER TO HOT ROLL CYLINDER & HR 16 Hrs. @250 F., 300 F., or 350 F. | | |
| | COOL TO APPROX. 150 F. | | |
| | MIX ON MULTIMIXER 5 MINUTES | | |
| | COOL TO 120 F. | | |
| | READ ES, Fann, BROOKFIELD @120 F. | | |
| | TRANSFER TO HPHT FUID LOSS CYLINDER | | |
| | READ HPHT FLUID LOSS @TARGET TEMPERATURE and 500 psi dP | | |

EXAMPLE #5

Preparation of Emulsified Oxidized Polyethylene Rheology Additive

A 25% active emulsion of A-C 395A was prepared by charging a heated, pre-weighed, KitchenAid mixer bowl at 210 F with 100 g A-C 395A and 125 g boiling distilled water then adding 6 g of 50% NaOH solution to neutralize the acidity of the A-C 395A and mixing on the KitchenAid mixer at low speed for 10 minutes. 25 g of a commonly used tall oil fatty acid (TOFA) based primary emulsifier for OBF, PineMul 100 (Mobile Rosin Oil Co.), was then added to aid in the emulsification of the A-C 395A. 144 g boiling distilled water was then added and mixture mixed on the KitchenAid mixer at low speed for an additional 15 minutes. The bowl and contents were then weighed to determine moisture loss during processing and boiling distilled water was added to replace water lost. The mixture was then sheared in a Hamilton Beach RIO Bar Blender for 15 minutes on high speed.

Preparation of OBF

This emulsion was then evaluated in both the diesel and mineral oil-based drilling fluids. The emulsion was added direct to the OBF in a multimixer after the brine addition and the mixing continued for 5 more minutes. The primary emulsifier components of those fluids were adjusted to compensate for the water and primary emulsifier content of the added A-C 395A emulsion.

Testing & Evaluating of OBF with comparative controls was done as in Example 1.
Table 5 Bentone 38 vs B92/Example 5 Preparation vs Bentone 42 in Diesel based OBF
Table 5A Bentone 38 vs B92/Example 5 Preparation vs Bentone 42 in Mineral Oil based OBF

TABLE 5

BENTONE 38 vs. BENTONE 42 vs. 6.0 g EXAMPLE #5 (25% A-C 395A Emulsion) + 4.5 g B92
Tested in 12 ppg 80:20 OWR Diesel Fluid Hot Rolled 16 Hours @250 F., 300 F., 350 F.
and HPHT Fluid Loss Tested @250 F., 300 F.. 350 F. and 500 psi dP

|   |   | BENTONE 38 | 6 g 25% A-C 395A Emulsion + 4.5 g B92 | BENTONE 42 |
|---|---|---|---|---|
| Initial | Fann 600 rpm @120 F. | 90 | 62 | 48 |
|  | 300 | 58 | 42 | 24 |
|  | 6 | 17 | 13 | 2 |
|  | 3 | 16 | 12 | 2 |
|  | 10 sec Gel | 16 | 12 | 2 |
|  | 10 min Gel | 17 | 13 | 3 |
|  | PV | 32 | 20 | 24 |
|  | YP | 26 | 22 | 0 |
|  | Brookfield RVT 0.5 rpm | 41,920 | 28,880 | 2,800 |
|  | ES | 1,435 | 1,937 | 1,003 |
| Hot Rolled O/N @ 250 F. | Fann 600 rpm @120 F. | 75 | 63 | 49 |
|  | 300 | 44 | 36 | 26 |
|  | 6 | 9 | 11 | 2 |
|  | 3 | 8 | 11 | 2 |
|  | 10 sec Gel | 9 | 12 | 2 |
|  | 10 min Gel | 9 | 13 | 2 |
|  | PV | 31 | 27 | 23 |
|  | YP | 13 | 9 | 3 |
|  | Brookfield RVT 0.5 rpm | 26,960 | 31,040 | 2,560 |
|  | ES | 1,356 | 1,493 | 572 |
|  | 250 F. HPHT FLUID LOSS (cc) | 0.4 | 0.5 | 1 |
|  | Water (cc) | NONE | NONE | NONE |
|  | Filtercake Thickness (inches) | 1/16 | 1/16 | 1/2 |
| Hot Rolled O/N @ 300 F. | Fann 600 rpm @120 F. | 55 | 52 | 48 |
|  | 300 | 30 | 30 | 24 |
|  | 6 | 4 | 6 | 2 |
|  | 3 | 3 | 6 | 1 |
|  | 10 sec Gel | 3 | 7 | 1 |
|  | 10 min Gel | 4 | 11 | 2 |
|  | PV | 25 | 22 | 24 |
|  | YP | 5 | 8 | 0 |
|  | Brookfield RVT 0.5 rpm | 9280 | 30,880 | 1600 |
|  | ES | 757 | 450 | 327 |
|  | 300 F. HPHT FLUID LOSS (cc) | 1.2 | 1.3 | 1.1 |
|  | Water (cc) | NONE | NONE | NONE |
|  | Filtercake Thickness (inches) | 1/2+ | 3/4 | 3/4 |
| Hot Rolled O/N @ 350 F. | Fann 600 rpm @120 F. | 48 | 43 | 47 |
|  | 300 | 23 | 21 | 23 |
|  | 6 | 1 | 2 | 1 |
|  | 3 | 1 | 2 | 1 |
|  | 10 sec Gel | 1 | 2 | 1 |
|  | 10 min Gel | 1 | 3 | 1 |
|  | PV | 25 | 22 | 24 |
|  | YP | −2 | −1 | −1 |
|  | Brookfield RVT 0.5 rpm | 1,120 | 5,440 | 80 |
|  | ES | 499 | 261 | 244 |
|  | 350 F. HPHT FLUID LOSS (cc) | 2.6 | 4.4 | 2.6 |
|  | Water (cc) | NONE | NONE | NONE |
|  | Filtercake Thickness (inches) | 1/2+ | 1 | 1 |

| 12 ppb 80:20 OWR INVERT DIESEL | | | |
|---|---|---|---|
| RED DIESEL | 194.8 | 194.8 | 194.8 |
| PM 100 | 5 | 4.6 | 5 |
| PM 201 | 5 | 5 | 5 |
|  | MIX ON MULTIMIXER 2 MIXER | | |
| LIME | 5 | 5 | 5 |
|  | MIX ON MULTIMIXER 5 MINUTES | | |
| 10.8 ppg CaCl2 BRINE | 74.5 | 70.4 | 74.5 |
|  | MIX ON MULTIMIXER 15 MINUTES | | |
| ORGANOCLAY | 6 | 4.5 | 6 |
| 25% A-C 395A EMULSION |  | 6 |  |
|  | MIX ON MULTIMIXER 5 MINUTES | | |
| BARTITE 4.1 | 215 | 215 | 215 |
|  | MIX ON MULTIMIXER 15 MINUTES | | |
|  | TRANSFER TO RIO BLENDER | | |
|  | SHEAR ON RIO BLENDER 15 MINUTES | | |
|  | READ ES, Fann, BROOKFIELD @120 F. | | |

TABLE 5-continued

BENTONE 38 vs. BENTONE 42 vs. 6.0 g EXAMPLE #5 (25% A-C 395A Emulsion) + 4.5 g B92
Tested in 12 ppg 80:20 OWR Diesel Fluid Hot Rolled 16 Hours @250 F., 300 F., 350 F.
and HPHT Fluid Loss Tested @250 F., 300 F.. 350 F. and 500 psi dP TRANSFER TO HOT ROLL CYLINDER & HR 16 Hrs. @250 F., 300 F., or 350 F.
COOL TO APPROX. 150 F.
MIX ON MULTIMIXER 5 MINUTES
COOL TO 120 F.
READ ES, Fann, BROOKFIELD @120 F.
TRANSFER TO HPHT FUID LOSS CYLINDER
READ HPHT FLUID LOSS @TARGET TEMPERATURE and 500 psi dP

TABLE 5A

BENTONE 38 vs. BENTONE 42 VS. EXAMPLE #5a - 4 g 25% A-C 395A EMULSION + 3 g B92
Tested in 14 ppg 80:20 OWR Mineral Oil Fluid Hot Rolled 16 Hours @250 F., 300 F., 350 F.
and HPHT Fluid Loss Tested @250 F., 300 F., 350 F. and 500 psi dP

|  |  | BENTONE 38 | 6 g 25% A-C 39SA Emulsion + 4.5 g B92 | BENTONE 42 |
|---|---|---|---|---|
| Initial | Fann 600 rpm @120 F. | 66 | 71 | 48 |
|  | 300 | 41 | 44 | 25 |
|  | 6 | 10 | 13 | 2 |
|  | 3 | 9 | 12 | 2 |
|  | 10 sec Gel | 9 | 12 | 2 |
|  | 10 min Gel | 9 | 13 | 2 |
|  | PV | 25 | 27 | 23 |
|  | YP | 16 | 17 | 2 |
|  | Brookfield RVT 0.5 rpm | 19,280 | 31,920 | 1,600 |
|  | ES | 1,401 | 1,659 | 884 |
| Hot Rolled O/N @ 250 F. | Fann 600 rpm @120 F. | 91 | 93 | 54 |
|  | 300 | 55 | 59 | 27 |
|  | 6 | 8 | 23 | 2 |
|  | 3 | 7 | 22 | 1 |
|  | 10 sec Gel | 7 | 22 | 1 |
|  | 10 min Gel | 8 | 22 | 1 |
|  | PV | 36 | 34 | 27 |
|  | YP | 19 | 25 | 0 |
|  | Brookfield RVT 0.5 rpm | 19,840 | 43,680 | 0 |
|  | ES | 940 | 752 | 575 |
|  | 250 F. HPHT FLUID LOSS (cc) | 0.3 | 0.2 | 0.9 |
|  | Water (cc) | NONE | NONE | NONE |
|  | Filtercake Thickness (inches) | ½ | 1 | ¾+ |
| Hot Rolled O/N @ 300 F. | Fann 600 rpm @120 F. | 48 | 57 | 48 |
|  | 300 | 24 | 30 | 25 |
|  | 6 | 1 | 2 | 1 |
|  | 3 | 1 | 2 | 1 |
|  | 10 sec Gel | 1 | 2 | 1 |
|  | 10 min Gel | 1 | 5 | 1 |
|  | PV | 24 | 27 | 23 |
|  | YP | 0 | 3 | 2 |
|  | Brookfield RVT 0.5 rpm | 0 | 10,240 | 0 |
|  | ES | 428 | 455 | 352 |
|  | 300 F. HPHT FLUID LOSS (cc) | 1 | 0.9 | 0.9 |
|  | Water (cc) | NONE | NONE | NONE |
|  | Filtercake Thickness (inches) | ¾ | 1 | ¾+ |
| Hot Rolled O/N @ 350 F. | Fann 600 rpm @120 F. | 55 | 64 | 56 |
|  | 300 | 28 | 34 | 30 |
|  | 6 | 1 | 5 | 1 |
|  | 3 | 1 | 5 | 1 |
|  | 10 sec Gel | 1 | 5 | 1 |
|  | 10 min Gel | 1 | 6 | 1 |
|  | PV | 27 | 30 | 24 |
|  | YP | 1 | 4 | 2 |
|  | Brookfield RVT 0.5 rpm | 400 | 7,520 | 480 |
|  | ES | 273 | 448 | 218 |
|  | 350 F. HPHT FLUID LOSS (cc) | 2.5 | 4.7 | 2.2 |
|  | Water (cc) | NONE | NONE | NONE |
|  | Filtercake Thickness (inches) | 1 | 1¼ | 1 |

TABLE 5A-continued

BENTONE 38 vs. BENTONE 42 VS. EXAMPLE #5a - 4 g 25% A-C 395A EMULSION + 3 g B92
Tested in 14 ppg 80:20 OWR Mineral Oil Fluid Hot Rolled 16 Hours @250 F., 300 F., 350 F.
and HPHT Fluid Loss Tested @250 F., 300 F., 350 F. and 500 psi dP

| 14 ppb 80:20 OWR INVERT MINERAL OIL FLUID | | | |
|---|---|---|---|
| ESCAID 110 MINERAL OIL | 155.3 | 155.3 | 155.3 |
| PM 100 | 8 | 7.7 | 8 |
| PM 201 | 5 | 5 | 5 |
| | MIX ON MULTIMIXER 2 MIXER | | |
| LIME | 5 | 5 | 5 |
| | MIX ON MULTIMIXER 5 MINUTES | | |
| 10.8 ppg CaCl2 BRINE | 63.7 | 61 | 63.7 |
| | MIX ON MULTIMIXER 15 MINUTES | | |
| ORGANOCLAY | 4 | 3 | 4 |
| 25% A-C 395 EMULSION | | 4 | |
| | MIX ON MULTIMIXER 5 MINUTES | | |
| BARTITE 4.1 | 350 | 350 | 350 |
| | MIX ON MULTIMIXER 15 MINUTES | | |
| | TRANSFER TO RIO BLENDER | | |
| | SHEAR ON RIO BLENDER 15 MINUTES | | |
| | READ ES, Fann, BROOKFIELD @120 F. | | |
| | TRANSFER TO HOT ROLL CYLINDER & HR 16 Hrs. @250 F., 300 F., or 350 F. | | |
| | COOL TO APPROX. 150 F. | | |
| | MIX ON MULTIMIXER 5 MINUTES | | |
| | COOL TO 120 F. | | |
| | READ ES, Fann, BROOKFIELD @120 F. | | |
| | TRANSFER TO HPHT FUID LOSS CYLINDER | | |
| | READ HPHT FLUID LOSS @TARGET TEMPERATURE and 500 psi dP | | |

EXAMPLE #6

Preparation of Dispersed Forms of Oxidized Polyethylene Rheology Additive

A 30% active oxPE in mineral oil (NEOFLO 4633) dispersion containing 5% A-C 645P (LDoxEVA copolymer, Honeywell) and 25% OPI 1316 (HDoxPE, OPI) was produced by initially charging 20 g A-C 645P to a heated, pre-weighed KitchenAid mixer bowl at 210 F, followed by addition of 100 g OPI 1316 powder, then adding 280 g of hot NEOFLO 4633. While still in the heated mixing bowl, the mixture was agitated using an IKA benchtop disperser at low speed for 15 minutes, then sheared at high speed for another 15 minutes. This dispersion was then cooled to ambient temperature under low speed agitation. The dispersion was then weighed and any NEOFLO 4633 lost during processing was replaced and mixed into the finished pourable dispersion.

This dispersion was tested in a commercial 80:20 oil to water ratio (OWR), 12 ppg diesel drilling fluid that has been circulated downhole in the field. This fluid contains drill cuttings and represents an actual commercial drilling fluid. The field fluid, without added oxPE dispersion, was sheared for 15 minutes on a Rio Blender then tested at 120 F. Fann 600 rpm, 300 rpm, 6 rpm, 3 rpm, 10 sec gel, and 10 minute gel were checked. Brookfield RVT 0.5 rpm viscosity was tested along with electrical stability (ES). The fluid was then hot rolled overnight at 250 F and again tested at 120 F.

This same procedure was followed for the field fluid with 1 pound per barrel of the 30% LDoxPE/HDoxPE dispersion added. The results clearly demonstrate the efficacy of the invention, particularly after hot rolling overnight at 250 F.

Several batches of oxPE/mineral oil dispersions were prepared containing various LDoxPE, HDoxPE, and LDoxPE copolymers and dispersed in NEOFLO 4633. 25% active oxPE in mineral oil (NEOFLO 4633) dispersions were produced by initially charging 100 g of total oxPE to a heated, pre-weighed KitchenAid mixer bowl at 210 F, followed by the addition of 300 g of hot NEOFLO 4633. While still in the heated mixing bowl, the mixture was agitated using an IKA benchtop disperser at low speed for 15 minutes, then sheared at high speed for another 15 minutes. This dispersion was then cooled to 80 F under low speed agitation. The dispersion was then weighed and any NEOFLO 4633 lost during processing was replaced and mixed into the finished pourable dispersion.

These dispersions were then tested in the 80:20 OWR 12 ppb Diesel lab fluid as done in EXAMPLE #1. This testing demonstrates the differing behaviors of various LDoxPE, HDoxPE, and oxPE copolymers in a typical diesel drilling fluid.

Table 6
Table 6A
Table 6A continued

TABLE 6

Actual Field 80:20 OWR 12 ppb Diesel Fluid
Tested After Initial Shearing and After Hot Rolling 16 Hours @250 F.

| | | Field Fluid Without 1 ppb EXAMPLE #6 Addition | Field Fluid With 1 ppb EXAMPLE #6 Addition |
|---|---|---|---|
| Initial | Fann 600 rpm @120 F. | 79 | 84 |
| | 300 | 45 | 50 |
| | 6 | 4 | 7 |

TABLE 6-continued

Actual Field 80:20 OWR 12 ppb Diesel Fluid
Tested After Initial Shearing and After Hot Rolling 16 Hours @250 F.

|  |  | Field Fluid Without 1 ppb EXAMPLE #6 Addition | Field Fluid With 1 ppb EXAMPLE #6 Addition |
|---|---|---|---|
|  | 3 | 4 | 6 |
|  | 10 sec Gel | 4 | 6 |
|  | 10 min Gel | 5 | 7 |
|  | PV | 34 | 34 |
|  | YP | 11 | 16 |
|  | Brookfield RVT 0.5 rpm | 6,320 | 11,040 |
|  | ES | 476 | 494 |
| Hot Rolled O/N @ 250 F. | Fann 600 rpm @120 F. | 69 | 77 |
|  | 300 | 37 | 43 |
|  | 6 | 3 | 6 |
|  | 3 | 3 | 6 |
|  | 10 sec Gel | 3 | 6 |
|  | 10 min Gel | 4 | 7 |
|  | PV | 32 | 34 |
|  | YP | 5 | 9 |
|  | Brookfield RVT 0.5 rpm | 4,640 | 15,840 |
|  | ES | 321 | 350 |
|  | 250 F. HPHT FLUID LOSS (cc) | 0.7 | 0.7 |
|  | Water (cc) | NONE | NONE |
|  | Filtercake Thickness (inches) | 1/8 | 1/8 |

TABLE 6A

Mineral Oil Dispersions of oxPE Polymers/Copolymers
Tested in 12 ppg 80:20 OWR Diesel Fluid After Initial Shearing &Hot Rolled 16 Hours @ 200 F., 250 F., 300 F.
HPHT Fluid Loss Tested at 500 psi dp

|  |  | 25% A-C 64SP + 75% NEOFLO 4633 6.0 g | 25% OPI 1930 + 75% NEOFLO 4633 6.0 g | 12.5% OPI 1316 + 12.5% A-C 645P + 75% NEOFLO 4633 6.0 g | 12.5% OPI 1930 + 12.5% A-C 645P + 75% NEOFLO 4633 6.0 g |
|---|---|---|---|---|---|
| Initial | Fann 600 rpm @90 F. | 68 | 57 | 63 | 61 |
|  | 300 | 42 | 36 | 40 | 38 |
|  | 6 | 14 | 11 | 13 | 13 |
|  | 3 | 13 | 10 | 12 | 12 |
|  | 10 sec Gel | 14 | 10 | 12 | 12 |
|  | 10 min Gel | 15 | 10 | 13 | 13 |
|  | PV | 26 | 21 | 23 | 23 |
|  | YP | 16 | 15 | 17 | 15 |
|  | Brookfield RVT 0.5 rpm | 39,200 | 23,360 | 31,840 | 31,600 |
|  | ES | 1955 | 1527 | 1708 | 1773 |
| Hot Rolled O/N @ 250 F. | Fann 600 rpm @120 F. | 71 | 64 | 67 | 69 |
|  | 300 | 42 | 39 | 40 | 42 |
|  | 6 | 14 | 13 | 12 | 14 |
|  | 3 | 13 | 12 | 11 | 14 |
|  | 10 sec Gel | 14 | 12 | 11 | 15 |
|  | 10 min Gel | 15 | 12 | 12 | 16 |
|  | PV | 29 | 25 | 27 | 27 |
|  | YP | 13 | 14 | 13 | 15 |
|  | Brookfield RVT 0.5 rpm | 36,400 | 29,280 | 26,240 | 38,080 |
|  | ES | 1975 | 1999+ | 1999+ | 1999+ |
|  | 200 F. HPHT FLUID LOSS (cc) | 0.7 | 1.0 | 0.6 | 0.4 |
|  | Water (cc) | NONE | NONE | NONE | NONE |
|  | Filtercake Thickness (in.) | 1/8 | 1/16 | 3/16 | 3/16 |
| Hot Rolled O/N @ 300 F. | Fann 600 rpm @120 F. | 59 | 60 | 62 | 62 |
|  | 300 | 34 | 38 | 37 | 38 |
|  | 6 | 6 | 16 | 10 | 13 |
|  | 3 | 6 | 16 | 10 | 12 |
|  | 10 sec Gel | 6 | 18 | 11 | 13 |
|  | 10 min Gel | 7 | 21 | 13 | 14 |
|  | PV | 25 | 22 | 25 | 24 |
|  | YP | 9 | 16 | 12 | 14 |
|  | Brookfield RVT 0.5 rpm | 13,040 | 46,000 | 33,760 | 40,160 |
|  | ES | 1102 | 1174 | 1050 | 1162 |
|  | 250 F. HPHT FLUID LOSS (cc) | 0.5 | 0.4 | 0.3 | 0.3 |
|  | Water (cc) | NONE | NONE | NONE | NONE |
|  | Filtercake Thickness (in.) | 5/8 | 1/4 | 3/8 | 3/8 |

TABLE 6A-continued

Mineral Oil Dispersions of oxPE Polymers/Copolymers
Tested in 12 ppg 80:20 OWR Diesel Fluid After Initial Shearing &Hot Rolled 16 Hours @ 200 F., 250 F., 300 F.
HPHT Fluid Loss Tested at 500 psi dp

|  |  |  |  |  |  |
|---|---|---|---|---|---|
| Hot Rolled O/N @ 350 F. | Fann 600 rpm @120 F. | 42 | 52 | 46 | 46 |
|  | 300 | 21 | 30 | 24 | 25 |
|  | 6 | 1 | 7 | 2 | 2 |
|  | 3 | 1 | 7 | 1 | 2 |
|  | 10 sec Gel | 1 | 7 | 1 | 2 |
|  | 10 min Gel | 1 | 11 | 3 | 5 |
|  | PV | 21 | 22 | 22 | 21 |
|  | YP | 0 | 8 | 2 | 4 |
|  | Brookfield RVT 0.5 rpm | 0 | 26,640 | 960 | 11,600 |
|  | ES | 355 | 559 | 404 | 373 |
|  | 250 F. HPHT FLUID LOSS (cc) | 1.1 | 1.1 | 1.3 | 1.7 |
|  | Water (cc) | NONE | NONE | NONE | NONE |
|  | Filtercake Thickness (in.) | ½ | ½ | ½ | ⅜ |

|  |  | 16.7% OPI 1316 + 8.3% A-C 645P + 75% NEOFLO 4633 6.0 g | 18.75% OPI 1316 + 6.25% A-C 629 + 75% NEOFLO 4633 6.0 g | 20% OPI 1316 + 5% A-C 629 + 75% NEOFLO 4633 6.0 g | 20% OPI 1930 + 5% A-C 629 + 75% NEOFLO 4633 6.0 g |
|---|---|---|---|---|---|
| Initial | Fann 600 rpm @90 F. |  | 58 | 61 | 60 |
|  | 300 |  | 36 | 40 | 39 |
|  | 6 |  | 11 | 13 | 14 |
|  | 3 |  | 10 | 12 | 13 |
|  | 10 sec Gel |  | 10 | 13 | 13 |
|  | 10 min Gel |  | 11 | 13 | 13 |
|  | PV |  | 22 | 21 | 21 |
|  | YP |  | 14 | 19 | 18 |
|  | Brookfield RVT 0.5 rpm |  | 25,520 | 29,600 | 29,200 |
|  | ES |  | 1616 | 1922 | 1897 |
| Hot Rolled O/N @ 250 F. | Fann 600 rpm @120 F. |  | 64 | 64 | 67 |
|  | 300 |  | 38 | 39 | 41 |
|  | 6 |  | 13 | 12 | 13 |
|  | 3 |  | 12 | 11 | 13 |
|  | 10 sec Gel |  | 12 | 12 | 13 |
|  | 10 min Gel |  | 13 | 12 | 14 |
|  | PV |  | 26 | 25 | 26 |
|  | YP |  | 12 | 14 | 15 |
|  | Brookfield RVT 0.5 rpm |  | 25,600 | 25,280 | 27,280 |
|  | ES |  | 1999 | 1,835 | 1,874 |
|  | 200 F. HPHT FLUID LOSS (cc) |  | 1 | 1 | 1 |
|  | Water (cc) |  | NONE | NONE | NONE |
|  | Filtercake Thickness (inches) |  | ⅛ | ⅛ | ⅜ |
| Hot Rolled O/N @ 300 F. | Fann 600 rpm @120 F. |  | 59 | 63 | 66 |
|  | 300 |  | 36 | 39 | 41 |
|  | 6 |  | 12 | 15 | 18 |
|  | 3 |  | 11 | 14 | 17 |
|  | 10 sec Gel |  | 12 | 14 | 19 |
|  | 10 min Gel |  | 14 | 17 | 20 |
|  | PV |  | 23 | 24 | 25 |
|  | YP |  | 13 | 15 | 16 |
|  | Brookfield RVT 0.5 rpm |  | 36,960 | 45,600 | 38,720 |
|  | ES |  | 1107 | 1,531 | 1,812 |
|  | 250 F. HPHT FLUID LOSS (cc) |  | 0.4 | 0.4 | 0.3 |
|  | Water (cc) |  | NONE | NONE | NONE |
|  | Filtercake Thickness (inches) |  | ⅞ | ⅛ | ¼ |
| Hot Rolled O/N @ 350 F. | Fann 600 rpm @120 F. |  | 49 | 56 | 51 |
|  | 300 |  | 27 | 34 | 29 |
|  | 6 |  | 3 | 11 | 7 |
|  | 3 |  | 3 | 10 | 6 |
|  | 10 sec Gel |  | 3 | 11 | 7 |
|  | 10 min Gel |  | 8 | 12 | 10 |
|  | PV |  | 22 | 22 | 22 |
|  | YP |  | 4 | 12 | 7 |
|  | Brookfield RVT 0.5 rpm |  | 16,240 | 34,080 | 24,880 |
|  | ES |  | 540 | 540 | 443 |
|  | 250 F. HPHT FLUID LOSS (cc) |  | 0.9 | 1.7 | 1.5 |
|  | Water (cc) |  | NONE | NONE | NONE |
|  | Filtercake Thickness (inches) |  | ¾ | ½ | 3/16 |

TABLE 6A-continued

Mineral Oil Dispersions of oxPE Polymers/Copolymers
Tested in 12 ppg 80:20 OWR Diesel Fluid After Initial Shearing &Hot Rolled 16 Hours @ 200 F., 250 F., 300 F.
HPHT Fluid Loss Tested at 500 psi dp

| 12 ppb 80:20 OWR INVERT DIESEL | |
|---|---|
| DIESEL | 190.3 |
| PM 100 | 4.6 |
| PM 201 | 5 |
| | MIX ON MULTIMIXER 2 MIXER |
| LIME | 5 |
| | MIX ON MULTIMIXER 5 MINUTES |
| 10.8 ppg CaCl2 BRINE | 74.5 |
| | MIX ON MULTIMIXER 15 MINUTES |
| ORGANOCLAY | 4.5 |
| 25% OxPE Wax Dispersion | 6 |
| | MIX ON MULTIMIXER 5 MINUTES |
| BARTITE 4.1 | 215 |
| | MIX ON MULTIMIXER 15 MINUTES |
| | TRANSFER TO RIO BLENDER |
| | SHEAR ON RIO BLENDER 15 MINUTES |
| | READ ES, Fann, BROOKFIELD @120 F. |
| | TRANSFER TO HOT ROLL CYLINDER & HR 16 Hrs. @200 F., 250 F., 300 F. |
| | COOL TO APPROX. 150 F. |
| | MIX ON MULTIMIXER 5 MINUTES |
| | COOL TO 120 F. |
| | READ ES, Fann, BROOKFIELD @120 F. |
| | TRANSFER TO HPHT FUID LOSS CYLINDER |
| | READ HPHT FLUID LOSS @200 F., 250 F., 300 F. and 500 psi dP |

I claim:

1. A rheology modifier comprising oxidized polyethylene, which when added tp an oil-based drilling fluid improves the shear thinning rheology of the oil drilling fluids based fluid at downhole temperatures from 250 F to 350 F, wherein the said oxidized polyethylene is in various physical forms selected from the group consisting of powder, specially processed powder, waxes, polymer composites with clay, and blends, mixtures, emulsions, suspensions and dispersions thereof.

2. The rheology modifier of claim 1 further cryogenically ground.

3. A method to improve High Temperature shear thinning rheology of an invert oil based drilling fluid employed in an operating oil well comprising preparing rheology modifier composition of claim 1;

mixing in the prepared modifier in-situ downhole in the oil well;

circulating the oil well fluid to achieve rheology improvements.

* * * * *